W. & F. G. FOLBERTH.
QUICK RELEASE NUT.
APPLICATION FILED OCT. 10, 1907.

900,843.                               Patented Oct. 13, 1908.

Witnesses
J. G. Hinkel
J. J. McCarthy

Inventors
William Folberth
& Fred G. Folberth
By Foster, Freeman, Watson & Coit
Attorneys

UNITED STATES PATENT OFFICE.

WILLIAM FOLBERTH AND FRED G. FOLBERTH, OF CLEVELAND, OHIO.

QUICK-RELEASE NUT.

No. 900,843.            Specification of Letters Patent.            Patented Oct. 13, 1908.

Application filed October 10, 1907. Serial No. 396,843.

*To all whom it may concern:*

Be it known that we, WILLIAM FOLBERTH and FRED G. FOLBERTH, citizens of the United States, and residing at Cleveland, in the county of Cuyahoga and State of Ohio, have invented certain new and useful Improvements in Quick-Release Nuts, of which the following is a specification.

This invention relates to quick release nuts, and its object is to provide means whereby the nut may be quickly released, for the purpose of removal and application, and also whereby it may be locked in position after it has been applied as desired.

A further object is to provide convenient means for turning the nut when it is applied or removed.

It consists broadly in a nut made up of two parts which tend to separate by spring action so that both parts will not normally be in position to engage closely the screw threads on the part to which the nut is to be applied, together with a cam carried by an arm for the purpose of forcing the two parts together.

Our invention is particularly applicable to the caps or protectors used on the air inlet plug of automobile wheels, and we have shown it applied to such a device, but it is to be understood that the invention is equally applicable to other devices.

Figure 1:
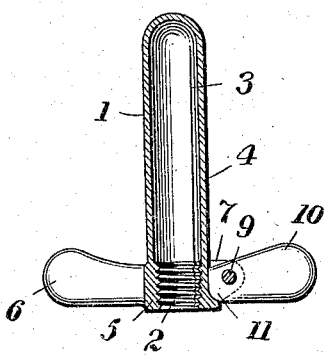
Figure 2:
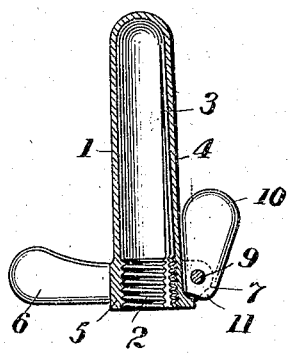
Figure 3:
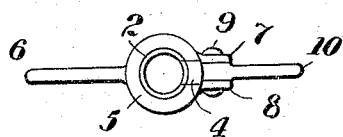
Figure 4:
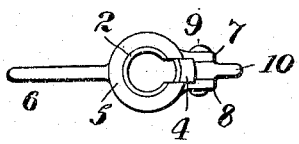
Figure 5:
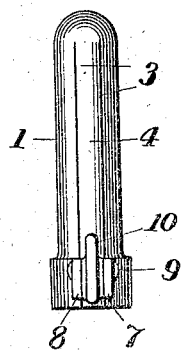
Figure 6:
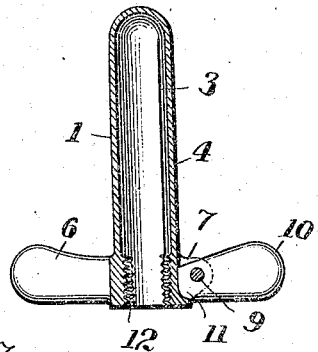
Figure 7:
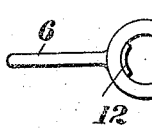

In the accompanying drawings: Figure 1 is a sectional view of a protector or cap mentioned above with our invention applied thereto, the parts being in position to clamp or firmly engage the threads of the part to which the cap is to be applied; Fig. 2 is a similar view, showing the nut released; Fig. 3 is a plan view of Fig. 1, taken from the bottom; Fig. 4 is a similar view of the device as shown in Fig. 2; Fig. 5 is a side view of Fig. 1; Fig. 6 is a sectional view of a modification of the invention; and Fig. 7 is a bottom view of the device shown in Fig. 6.

In the drawings we have shown a tubular sleeve 1 having a closed upper end and having on its interior at the bottom screw threads 2. This tubular sleeve has on one side two longitudinal cuts 3 through the walls, extending from the bottom nearly to the top, thus forming a tongue 4 which it will be observed is of thin metal. This tongue 4 is bent so that it will normally extend out from the surface of the sleeve, as indicated in Fig. 2. The screw threads on the bottom of the sleeve and on the bottom of the tongue are complementary, and as shown in Figs. 1 and 2, are continuous when the parts are in operative position. The sleeve at its bottom where the screw threads are is made of thickened metal, and is provided with a thumb piece 6 opposite the tongue 4, and is also provided with ears 7, 8 projecting upon each side of the tongue 4. A pin 9 passes through these ears and pivotally supports the arm 10 which corresponds in shape with the thumb piece 6, and it carries on its inner end a cam surface 11 adapted to press against the tongue 4, and thereby force it into position when the arm 10 is in its lowest position. When the arm 10 is in its upper position, as shown in Fig. 2, the tongue 4 is permitted by its spring action to project from the sleeve, thereby throwing the threads on that tongue out of operative position with the part to which the sleeve is applied.

It will be understood that when the tongue 4 is in its outer position in the form shown in Figs. 1 and 2, the screw threads of the part to which the sleeve is applied are engaged only throughout a part of their circumference, and therefore the engagement is loose and the sleeve may be easily and quickly rotated by means of the thumb piece 6 and arm 10, thus unscrewing the sleeve. It will also be understood that the cam surface 11 may be of such size and form as to force the tongue 4 against the threads of the part to which the sleeve is applied with greater or less force according to the desires of the operator, and thus the sleeve or nut may be locked more or less firmly to that part.

In Fig. 6 we have shown a modification of the invention in which the sleeve 1 is not provided at its lower end with screw threads extending through its circumference, but is only provided with a short sectional thread 12, opposite the tongue 4. In this instance, however, as well as in the form shown in Fig. 1, the threads on the sleeve and on the thumb are complementary and coöperate in engaging the threads of the part to which it is applied, but having the threads extend only for a part of the circumference, as in Figs. 6 and 7, it will be understood that when the tongue 4 is released, by the cam 11, the sleeve or nut may be removed vertically without turning upon the screw threaded part to which it has been applied. Aside from this fact the operation of the modification shown in Figs. 6 and 7 is the same as that shown in Figs. 1 and 2.

Having thus described our invention, what we claim and desire to secure by Letters Patent is:

1. The combination with a cylindrical sleeve having screw threads on its interior at one end and having two longitudinal slots through its walls at that end forming a tongue which is bent to normally stand out from the surface of the sleeve, of a pivoted arm carrying a cam adapted to force the tongue back into alinement with the surface of the sleeve.

2. The combination with a cylindrical sleeve having screw threads on its interior at one end and having two longitudinal slots through its walls at that end forming a tongue which is bent to normally stand out from the surface of the sleeve, of a pivoted arm carrying a cam adapted to force the tongue back into alinement with the surface of the sleeve, and a thumb piece projecting from said sleeve by which it may be turned.

3. The combination with a cylindrical sleeve having screw threads on its interior at one end and having two longitudinal slots through its walls at that end forming a tongue which is bent to normally stand out from the surface of the sleeve, of two ears projecting from the sleeve adjacent the tongue, and a short arm pivoted to said ears and carrying on its inner end a cam surface adapted to force the tongue into alinement with the balance of the sleeve.

4. The combination with a cylindrical sleeve having screw threads on its interior at one end and having two longitudinal slots through its walls at that end forming a tongue which is bent to normally stand out from the surface of the sleeve, of two ears projecting from the sleeve on opposite sides of the end of the tongue, a short arm in the shape of a thumb piece pivoted to said ears and carrying on its inner end a cam surface adapted to force the tongue into alinement with the balance of the sleeve when the arm is in a position at right angles to the sleeve, and a second thumb piece on the sleeve opposite the arm.

5. A quick release nut made up of two parts, each carrying a section of complementary screw threads, one part being normally held by spring action without the circumference of the circle upon which the threads of the other part are drawn, two ears projecting from one part on opposite sides of the other, and a short arm in the shape of a thumb piece pivoted to said ears and carrying a cam surface adapted to force the parts together whereby the nut may be locked or may be released quickly.

In testimony whereof we affix our signatures in presence of two witnesses.

WILLIAM FOLBERTH.
FRED G. FOLBERTH.

Witnesses:
O. E. EKLUND,
A. DAHL.